Aug. 4, 1959    C. D. ORSINI    2,897,541
APPARATUS FOR EXTRUDING SHEETS WITH STRIPED PATTERN
Filed Dec. 3, 1956    3 Sheets-Sheet 1
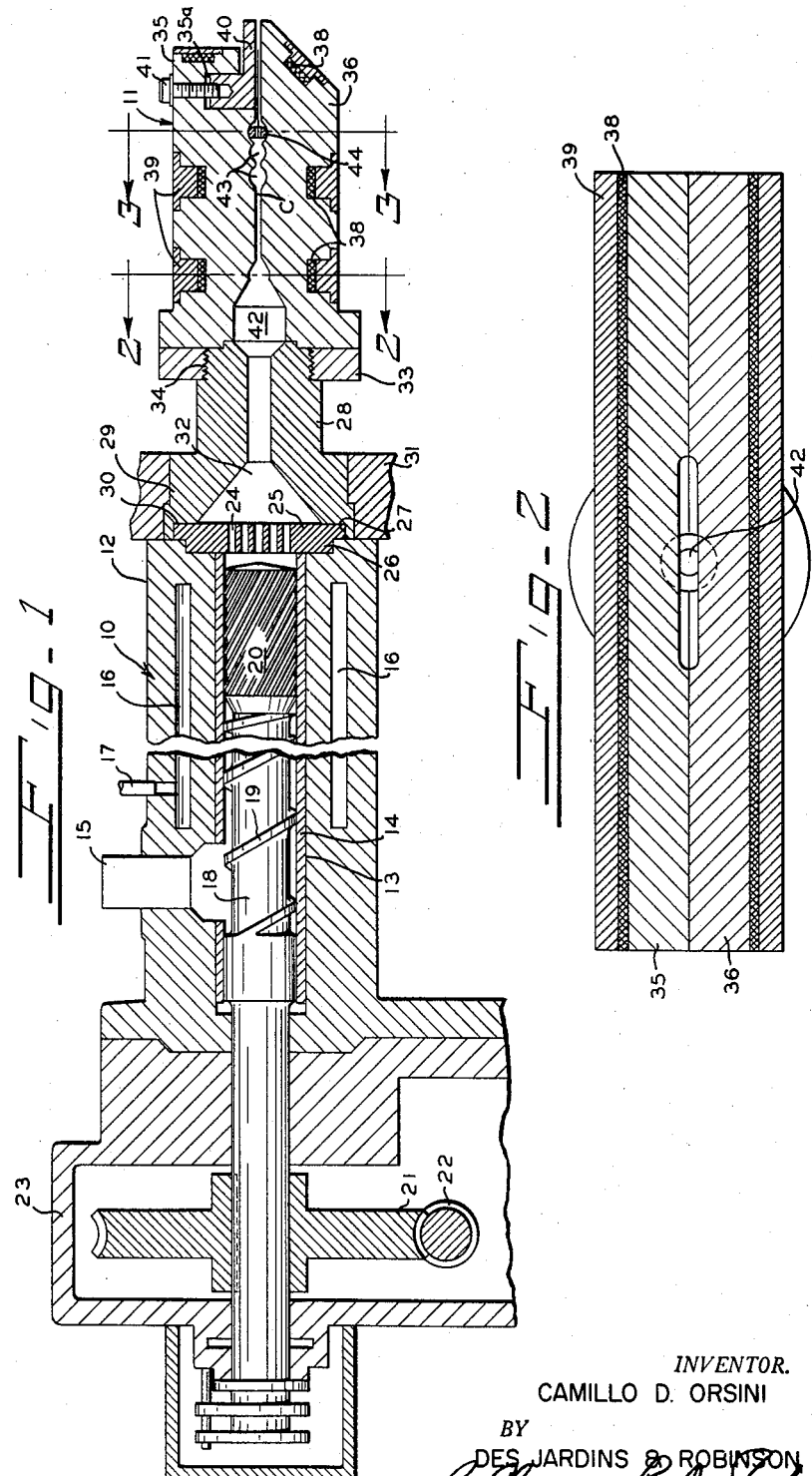
INVENTOR.
CAMILLO D. ORSINI
BY DES JARDINS & ROBINSON
*By Clarence B. Des Jardins*
HIS ATTORNEYS Aug. 4, 1959 C. D. ORSINI 2,897,541
APPARATUS FOR EXTRUDING SHEETS WITH STRIPED PATTERN
Filed Dec. 3, 1956 3 Sheets-Sheet 2
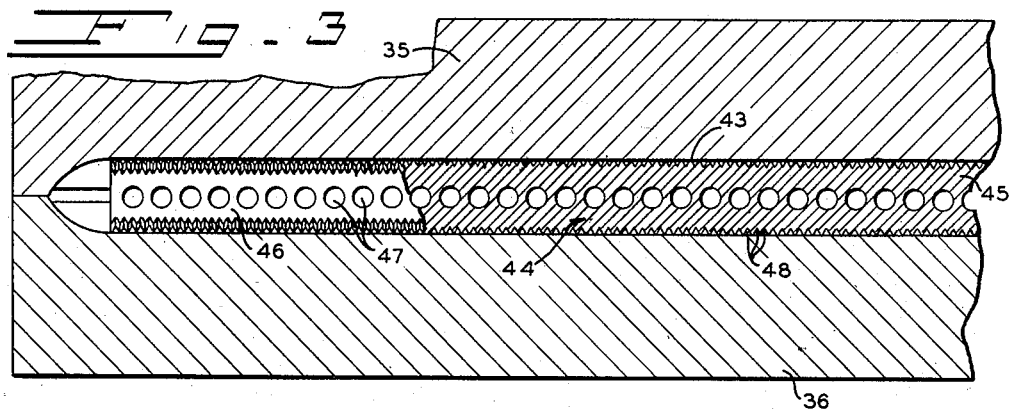
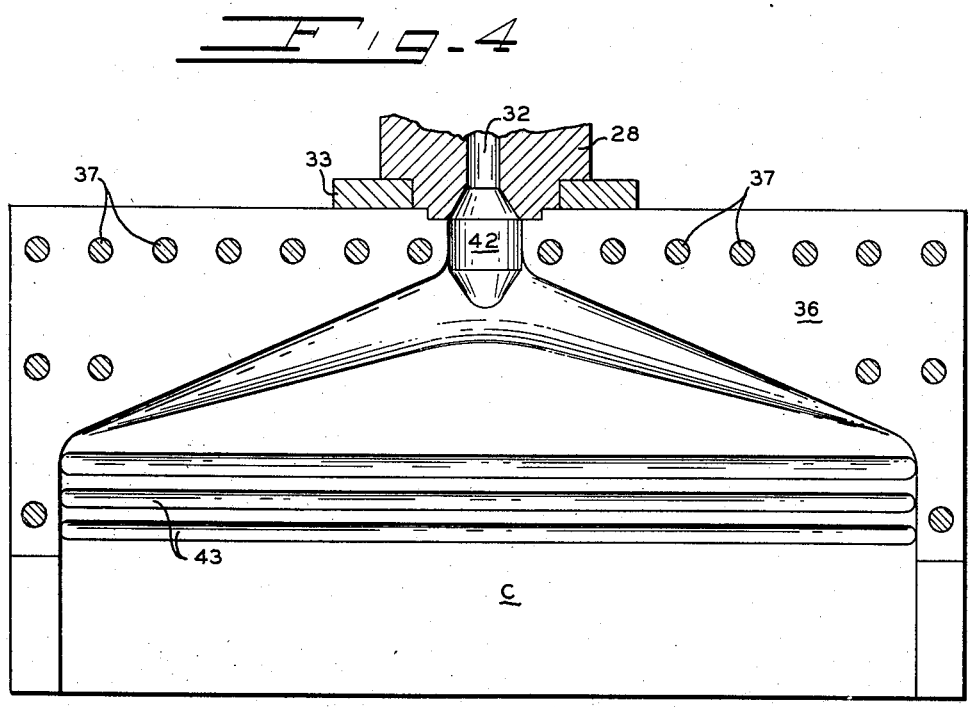
INVENTOR.
CAMILLO D. ORSINI
BY
DES JARDINS & ROBINSON
HIS ATTORNEYS

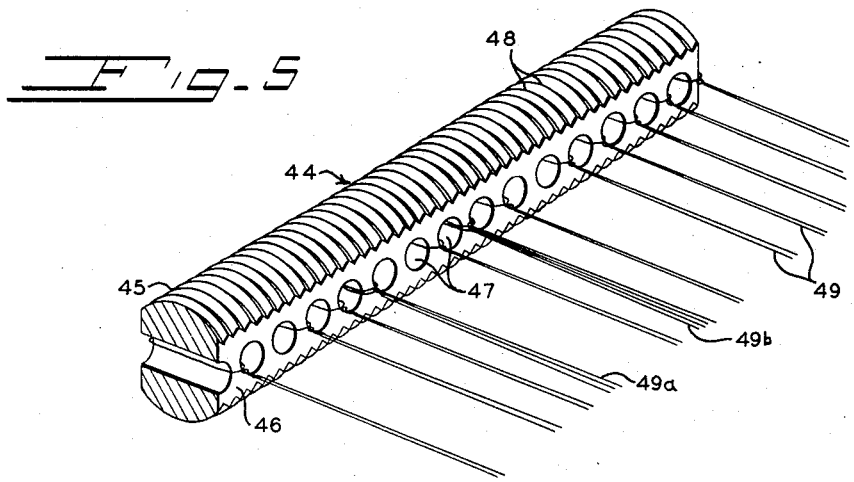

United States Patent Office 2,897,541
Patented Aug. 4, 1959

2,897,541

APPARATUS FOR EXTRUDING SHEETS WITH STRIPED PATTERN

Camillo Dante Orsini, Highland Park, N.J., assignor to Nixon Nitration Works, Nixon, N.J., a corporation of New Jersey Application December 3, 1956, Serial No. 625,866

2 Claims. (Cl. 18—12)

The present invention relates to an apparatus for producing a thermoplastic material in sheet form and, more particularly, to an apparatus for extruding a thermoplastic material as a sheet having a pattern of continuous lustrous stripes or veins spaced from one another.

It has been proposed previously to process a thermoplastic material containing a luster-producing agent such that various attractive designs were obtained in the finished article, as described, for example, in my prior Patents No. 2,149,066 and No. 2,171,095. In these instances, however, it is not possible to form a pleasing veined or striped design. It has been the practice to divide the mass of plastic material into a large number of sections or ribbons and then pass these ribbons over smooth, preferably metallic, surfaces to orient the particles of luster-producing agent so that their brilliant luster surfaces face outwardly. Subsequently, the ribbons are again forced together into a solid mass such as a rod or block. In this step the lustrous areas are not destroyed but appear in the product ultimately made from the thermoplastic material. Although the final appearance is attractive, there is no control of the distribution or particular shape of the lustrous areas which become somewhat haphazardly scattered throughout the mass of the thermoplastic material because of the reuniting of the thermoplastic ribbons. Accordingly, little or no overall uniform design is realized.

I have now found that if the thermoplastic material is initially formed, for example as a sheet, and the contacting or orientation of the luster-producing particles delayed until after this initial form has been made but before the material has set, a very attractive vein or striped pattern may be created. Also, lustrous effects of varying shades or nuances are possible.

It is, therefore, a principal object of the present invention to provide an apparatus for making a thermoplastic article having a vein or striped pattern.

Another object is to provide an apparatus for making a thermoplastic sheet having continuous lustrous areas or bands spaced from one another.

A further object is to provide an apparatus for producing a thermoplastic sheet having a design of parallel lustrous stripes of varying shades and intensities.

Other objects and advantages are apparent from the following description which is directed to one form of the invention and is not intended to limit the claims.

In accordance with this invention, a thermoplastic material is extruded in sheet form as through a die head. Before the material sets, the flow thereof is interrupted by an orienting means which selectively contacts predetermined areas spaced transversely of the sheet to align or orient the luster-producing particles in the thermoplastic material in parallelism with their light-reflecting surfaces facing outwardly. Wherever the material is so contacted, a lustrous stripe or band appears, spaced from companion bands, and having a width and shade or nuance influenced by the type of contact. The orienting means may take the form of a rod-like member extending transversely of the thermoplastic sheet and having openings to accommodate at least some of the plastic flow and thereby orient the luster-producing agent as described. Preferably the rod-like member may also have peripheral grooves and thread-like members to aid and/or vary the effect of the orientation.

The accompanying drawings illustrate a presently preferred embodiment wherein:

Figure 1 is a longitudinal section of extrusion apparatus having a die head embodying the present invention;

Figures 2 and 3 are sections of Figure 1 on the lines 2—2 and 3—3, respectively;

Figure 4 is a plan view of the lower half of the die head of Figure 1;

Figure 5 is a perspective view of an orienting means which produces the veined or striped appearance in the thermoplastic sheet.

Referring to the drawings, the extrusion apparatus of Figure 1 includes a feeding apparatus generally shown at 10 which forces the thermoplastic material into a die head generally indicated at 11. The latter houses orienting means of the present invention indicated at 44.

More particularly, the feeding apparatus 10 includes a generally tubular body 12 having an inner bore 13 provided with a liner 14. A hopper throat opening 15 provides entry for the thermoplastic material, and channels 16 and 17 accommodate a heating fluid to keep the thermoplastic material within the liner 14 at a proper molding temperature. A screw shaft 18 journaled in suitable bearings turns within the liner 14 and has a spiral flight 19. At the forward end of the shaft 18, there is an attachment 20, referred to in the art as a "torpedo," having a threaded portion of considerably greater lead. A worm gear 21, splined to the shaft 14, meshes with a worm 22 which is rotated by conventional means. Housing 23 encases the worm gear 21, worm 22, and the rearward end of the shaft 18.

The torpedo 20 of the screw shaft 18 forces the thermoplastic material through relatively minute openings 24 of a breaker plate 25. The latter has a boss portion 26 which fits within a similarly shaped recess in the tubular body 12, so that a flange portion 27 of the breaker plate 25 abuts against an end of the tubular body 12. An adapter 28 has an enlarged end 29 provided with an annular seat 30 to receive the flange portion 27 of the breaker plate, the rim of the end portion 29 also abutting against the end of the tubular body 12. A plate or door 31 suitably supports the adapter 28. Within the adapter, there is a passage 32 for the thermoplastic material consisting of a conically converging path leading to a central passage of uniform diameter which diverges at the exit end.

The die head 11 receives the discharge from the adapter 28. A support plate 33, to which the die head 11 is bolted, engages a threaded portion 34 of the adapter to maintain the die head in position. The die head consists of upper and lower parts 35 and 36, respectively, which are held together by bolts 37 (Figure 4). These parts may be suitably heated to keep the thermoplastic material in substantially a fluid state. In the form shown, electrical resistance heating strips 38 held in place by inserts 39 are used. Each of the parts 35 and 36 of the die head have substantially the same internal configuration except that the forward end of part 35 is notched as at 35a to receive an L-shaped lip 40. A bolt 41 passes through an opening in the die head part 35 to engage a threaded opening in the lip 40 and thereby position the lip with respect to the die head part 36 to control the thickness of the thermoplastic sheet as it is extruded from the die head.

The facing surfaces of the die head parts 35 and 36 are substantially alike to define therebetween an extrusion chamber C. A circular opening 42 at the entry side of the chamber C is aligned with the delivery exit of the passage 32 in the adapter 28 to receive therefrom the thermoplastic material. The opening 42 rapidly diverges so that the cross section of the extrusion chamber C is substantially rectangular thereafter to define the outline of a sheet form into which the thermoplastic material is to be extruded. Each of the die head parts 35 and 36 has several matching troughs 43 in which excess thermoplastic material accumulates as the sheet is extruded.

The orienting means 44 of the present invention is laid within one of the troughs 43 and preferably within the trough adjacent the exit end of the die head 11. The orienting means is placed angularly with respect to the direction of movement of the thermoplastic material. As shown in Figure 5, the orienting means generally indicated at 44 consists of a rod 45 having flat sides 46 through which openings 47 extend substantially along the length of the rod. Circumferential grooves 48 are cut in the arcuate surfaces of the rod 45. This can be conveniently done by simply threading the rod. Particularly in Figure 3 it will be noted that the crowns of the grooves 48 substantially abut the upper and lower walls of the trough 43, so that the plastic mass must flow between a die part and the sides of the grooves 48 at this point as well as through passages 47. Thread-like members 49, preferably metal wire, are threaded through the openings 47 and pointed in the direction of the flow of the plastic sheet. As shown, this may be accomplished by passing the opposite ends of the wire through two adjacent openings 47 and then twisting the wire around itself several turns. The distribution, number and thickness of the wires, and number of wires in each tuft materially affect the ultimate veined or striped pattern obtained. As indicated in Figure 5, wires need not be stationed at all of the openings 47. Additionally, some tufts of wire such as those shown at 49a and 49b may be thicker than others.

In practice, the thermoplastic material is fed, as molding powder or pellets, to the feeding apparatus 10 through the throat opening 15. The molding material should be previously dried to remove moisture. Very satisfactory results have been obtained with cellulose acetate or cellulose-acetate-butyrate. In any case, the plastic must have a luster-producing agent suspended therein. For this purpose, aluminum powder, bronze powder, pearl essence, or fish scale pigment may be used. Rotation of the screw shaft 18 forces the thermoplastic material, which has become plastic, to the right as viewed in Figure 1, through the breaker plate 25, adapter 28, and between the die head parts 35 and 36 into the extrusion chamber C, where the plastic mass acquires the general form of a sheet.

In passing through the openings 47 of the orienting means 44, the walls of the openings contact particles of the luster-producing agent, and, under the pressure of the extrusion operation, align or orient the particles in parallelism with their bright light-reflecting surfaces facing outwardly. When the plastic sheet finally emerges from the die head 11, the lustrous or shimmering areas so formed are not lost, but the luster appears even though it may be beneath the surface of the sheet. Since the orientation or aligning action is performed at selected areas transversely of the flow of the plastic sheet, the lustrous areas appear in the final product as continuous veins or bands or stripes which are spaced from one another. While merely the use of openings 47 in the rod 45 produces the desired effect, the conjoint use of the grooves 48 has been found to be helpful. A striped pattern is obtained by the use of a rod having only the openings 47 and the grooves 48.

The use of wires 49 or other thread-like material with the rod 45 produces a variegated veined appearance with different shades or nuances. In this regard, it is emphasized that a wire or tuft of wires need not be used at all of the openings 47 of the rod 45. Indeed, to some, a more attractive design is obtained when the practice of spacing the wires non-uniformly along the rod 45 is followed. In the same manner, where wires are employed, the number of wires used at different stations or openings 47 in the rod may be varied to produce additional gradation effects of luster. It will be apparent that where the foregoing modifications are used, the lustrous bands formed vary in shade and also in width. The exact manner by which the wires 49 achieve this is not completely understood. It may be that the wires serve differentially to spread out the aligned or oriented luster-producing particles, and the manner and degree of such spreading produce the variances in shades and widths. In the claims, the term "spreading" the veins or bands is used to denote this treatment of the luster-producing particles.

The method and apparatus herein described are susceptible of considerable variation without departing from the spirit of my invention, and therefore, the invention is claimed broadly, as indicated by the appended claims.

Having thus described my invention, what I claim as new and useful and desire to secure by United States Letters Patent is:

1. In apparatus for extruding a thermoplastic material containing luster-producing particles into substantially a sheet form, orienting means to produce a pleasing appearance on said sheet including a rod member disposed substantially transversely of the flow of said thermoplastic material, said rod member having openings in the direction of its width and circumferential grooves to accommodate at least some of the thermoplastic material during said flow, wires secured at one end to the rod member and having their ends free and extending from at least some of said openings in the direction of flow of said thermoplastic material, at least the openings and grooves serving to orient light-reflecting surfaces of said luster-producing particles contacted thereby to produce spaced lutrous areas on said sheet which are continuous and generally parallel the direction of movement of said sheet, the shades and intensities of said lustrous areas and the widths thereof being effected by the grouping and distribution of the wires along the rod member.

2. In combination, apparatus for extruding a thermoplastic material, having luster-producing particles suspended therein, into a sheet including a die head having an entry port communicating with an extrusion chamber, said chamber being adapted to impart a sheet form and having a trough extending transversely thereof, means to force the thermoplastic material through the entry port and into the extrusion chamber, a rod-like member disposed in said trough having transverse openings and circumferential grooves to accommodate at least part of the thermoplastic material during its travel through the extrusion chamber, tufts of wire of varying size attached at least to some of said openings with free ends extending toward the exit end of the extrusion chamber, at least said openings and grooves contacting luster-producing particles in the thermoplastic material during the extrusion thereof to orient light-reflecting surfaces of said particles, said orientation appearing as parallel lustrous streaks on the extruded sheet, said wires serving to vary the intensities and widths of the streaks formed at the openings of their attachment to the rod-like member to provide a pleasing artistic pattern.

References Cited in the file of this patent

UNITED STATES PATENTS

| | | |
|---|---|---|
| 2,047,395 | Stelkens | July 14, 1936 |
| 2,171,095 | Orsini | Aug. 29, 1939 |
| 2,682,081 | Fisch | June 29, 1954 |